United States Patent [19]

Wood

[11] Patent Number: 4,768,481
[45] Date of Patent: Sep. 6, 1988

[54] PROCESS AND ENGINE USING COMPRESSION IGNITION OF A HOMOGENEOUS FUEL-AIR MIXTURE

[75] Inventor: Charles D. Wood, San Antonio, Tex.
[73] Assignee: Southwest Research Institute, San Antonio, Tex.
[21] Appl. No.: 77,474
[22] Filed: Jul. 24, 1987
[51] Int. Cl.[4] .............................................. F02F 1/00
[52] U.S. Cl. ................................. 123/254; 123/287; 123/556
[58] Field of Search ............... 123/254, 257, 267, 287, 123/549, 546, 543, 547, 556

[56] References Cited

U.S. PATENT DOCUMENTS

| | | | |
|---|---|---|---|
| 2,893,360 | 7/1959 | Müller | 123/257 |
| 2,914,041 | 11/1959 | Froehlich | 123/257 |
| 3,425,399 | 2/1969 | Ward et al. | 123/32 |
| 3,703,886 | 11/1972 | Witzky | 123/32 |
| 3,937,188 | 2/1976 | Wrigley | 123/257 |
| 4,240,392 | 12/1980 | Matayoshi et al. | 123/254 |

OTHER PUBLICATIONS

"Compression-Ignited Homogeneous Charge Combustion", Najt and Foster, Society of Automotive Engineers, Inc., 1983 (Feb. 28–Mar. 4).
"Active-Thermo-Atmosphere Combustion (ATAC)-A New Combustion Process for Internal Combustion Engines", Onishi et al., Society of Automotive Engineers, Inc. 1979 (Feb. 26–Mar. 2).

*Primary Examiner*—E. Rollins Cross
*Attorney, Agent, or Firm*—Fulbright & Jaworski

[57] ABSTRACT

A process and engine using a homogeneous mixture of fuel and air but ignited spontaneously by high mixture temperatures produced by heating and by compression of the fuel charge in which a controlled rate of combustion is obtained by adding exhaust products to the fuel-air mixture. A combustion chamber is connected to the cylinder head of an internal combustion engine which is provided with a fuel and exhaust products which remain therein as fresh air is introduced into the cylinder due to a restricted entrance. A heater element at the entrance heats fresh air entering the combustion chamber on the compression stroke to produce spontaneous ignition of the homogeneous mixture.

7 Claims, 2 Drawing Sheets

SPARK-IGNITION

DIESEL

HOMOGENEOUS MIXTURE, COMPRESSION IGNITION

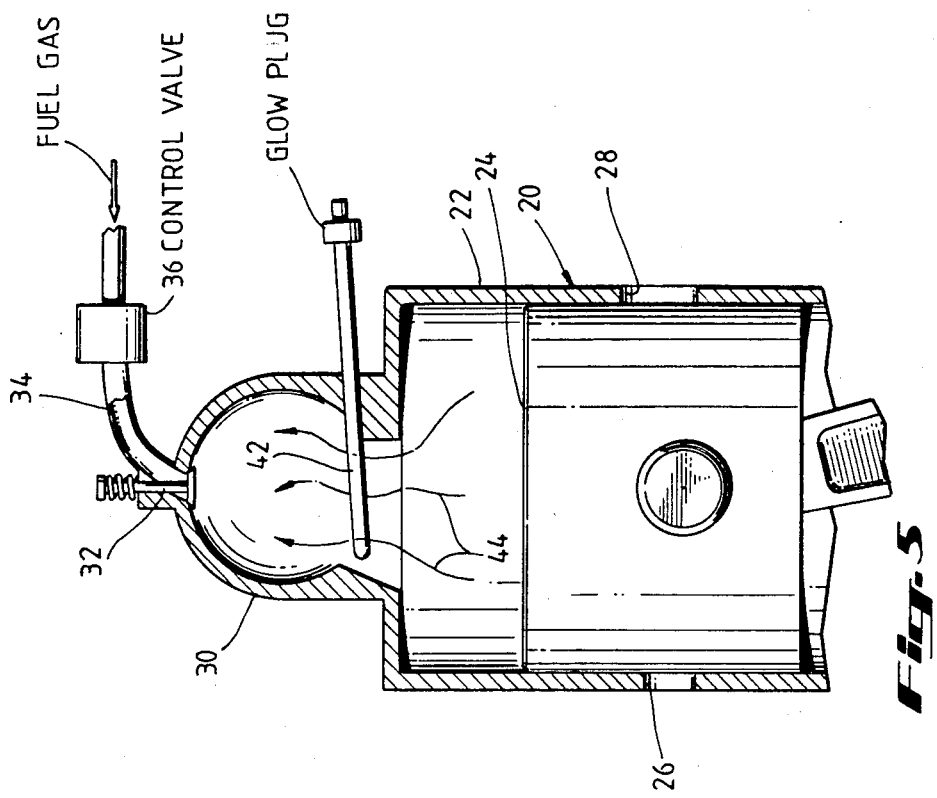
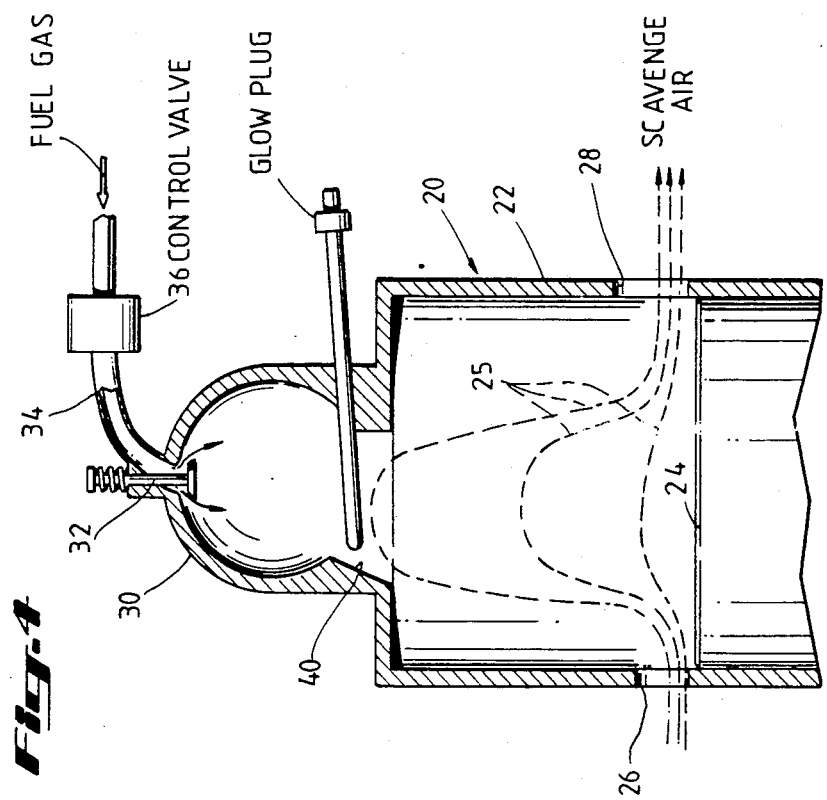

PROCESS AND ENGINE USING COMPRESSION IGNITION OF A HOMOGENEOUS FUEL-AIR MIXTURE

BACKGROUND OF THE INVENTION

Various types of combustion processes have been used in internal combustion engines such as the spark ignition process and the diesel process. In the spark ignition process, the flame front travels through the mixture and in the diesel process combustion progresses as the fuel and air is mixed.

Another combustion process is the experimental use of a homogeneous fuel-air mixture in which the entire mixture is ignited spontaneously by a high mixture temperature. However, this process results in excessive noise and engine damage.

The present invention is directed to a process and an engine using a homogeneous mixture of fuel and air which is ignited spontaneously by high mixture temperatures produced by heating and by compression of the fuel charge which uses engine exhaust products to control the high heat release rates, and avoids the complication of power absorbing high pressure fuel injection systems and combustion air throttle systems. The present invention does not throttle the combustion air and uses a heater element in the combustion chamber to precondition the fuel-air mixture. The present process and engine has the advantage in that the efficiency is similar to that of a diesel engine and is higher than a spark ignition engine.

SUMMARY

The present invention is directed to an internal combustion engine using compression ignition of a homogeneous fuel-air mixture in which the engine includes a cylinder having a piston movable therein and air inlet and outlet means connected to the cylinder for admitting fresh air and for exhausting exhaust products therefrom. A combustion chamber is connected to the cylinder and a check valve is connected between the combustion chamber and a source of gaseous fuel. Restriction means are provided between the combustion chamber and the cylinder for retaining the gaseous fuels in the combustion chamber and limiting fresh air entering the cylinder from sweeping the fuel gas and the exhaust products from the last firing cycle out of the combustion chamber. Heating means are positioned between the combustion chamber and the cylinder and extend substantially across the entrance to the combustion chamber for heating the fresh air entering the combustion chamber from the cylinder as the piston nears the end of the compression stroke whereby the compression in the combustion chamber of the mixture of exhaust products, fuel and heated air produces spontaneous ignition of the mixture. However, the combustion produced is smooth without an excessive rate of heat release and without excessive noise or engine damage.

A still further object of the present invention is wherein the compression ratio of the engine is between 8:1 and 14:1.

Yet a still further object of the present invention is a process of operating an internal combustion engine having a cylinder with a piston movable therein, air inlet and outlet means connected to the cylinder, a combustion chamber connected to the cylinder head, and heating means positioned between the combustion chamber and the cylinder. The process includes admitting a gaseous fuel through a check valve into the combustion chamber and admitting fresh air into the cylinder and exhausting the exhaust products of combustion from the cylinder without sweeping the gaseous fuel and the exhaust products remaining from the previous cycle from the combustion chamber. The process includes compressing the fresh air in the cylinder and moving the compressed fresh air across the heating means for heating the air and into the combustion chamber to provide a homogeneous mixture of exhaust products, fuel and air and thereafter igniting the mixture in the combustion chamber by compression.

The process of the present invention further includes Providing an amount of exhaust products in the mixture of about 20% of the volume of the combustion chamber for suppressing the rate of combustion.

The process further includes operating the engine over a fuel-air ratio between about 10% to 60% of stoichiometric.

Further objects, features and advantages will be apparent from the following description of a presently, preferred embodiment of the invention, given for the purpose of disolosure, and taken in conjunction with the accompanying drawings.

BRIEF DESCRIPTION OF THE DRAWINGS

FIG. 4 is a schematic elevational view of an engine according to the present invention shown during the scavenging process, and FIG. 5 is a view similar to FIG. 4 showing the engine of FIG. 4 in the compression cycle.

DESCRIPTION OF THE PREFERRED EMBODIMENT

FIGS. 1A and 1B, FIGS. 2A and 2B, and FIGS. 3A and 3B illustrate various types of combustion processes that could be used in an internal combustion engine. In the spark ignition process of FIGS. 1A and 1B, the entire volume of the combustion chamber 10 is filled with a prepared mixture ("prepared" means a thoroughly mixed volume of fuel and air). Ignition is initiated by a spark plug 12 and a flame front 14 progressively travels through the mixture. As each increment of mixture burns, the entire heat of reaction of this increment is released. The heat released increases as the volume of reacted mixture increases.

Figure 2A:
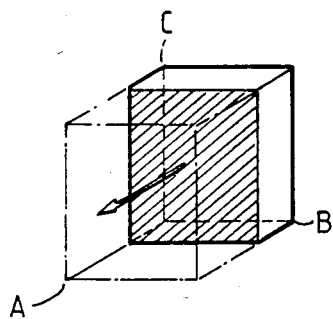
FIG. 2A is a three-dimensional graph for a diesel process.
Figure 2B:
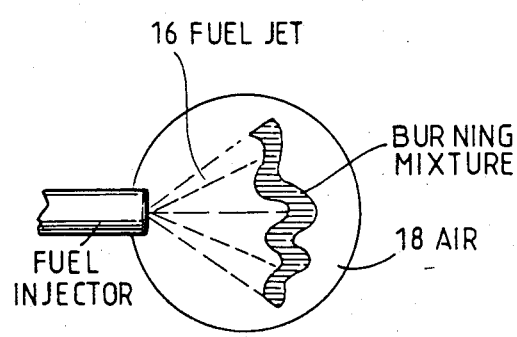
FIG. 2B is a schematic elevational view of a diesel process.

FIGS. 2A and 2B illustrate the diesel process. Here a jet 16 of liquid fuel is injected into hot air 18 and the mixing process between the fuel 16 and air 18 progresses relatively slowly. Ignition is produced spontaneously by the elevated temperature of the mixture. As the fuel mixes with the air, it reacts and releases heat. The entire heat of reaction is released from each increment of prepared fuel-air mixture.

Figure 3A:
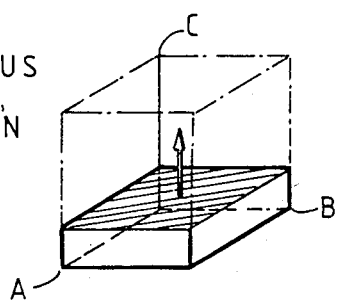
FIG. 3A is a three-dimensional graph for a homogeneous mixture compression ignition process.
Figure 3B:
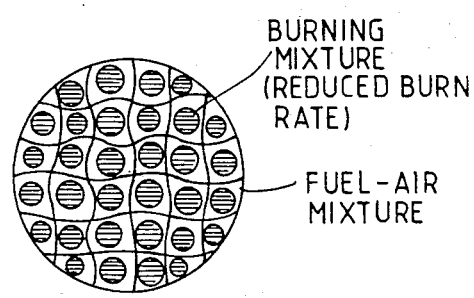
FIG. 3B is a schematic elevational view of a homogeneous mixture compression ignition process.

Referring now to FIGS. 3A and 3B, a homogeneous mixture compression ignition process is shown which was not thought to be suitable in engines because of the high rate of heat release. In this process the entire fuel charge is mixed with the air before combustion to provide a homogeneous mixture. However, ignition of the entire mixture is produced spontaneously by a high mixture temperature. In conventional experiments using this process, the heat release rate is exceedingly fast, resulting in excessive noise and engine damage. However, under certain conditions the heat release rate can be sufficiently suppressed so that combustion is slow enough for acceptable engine operation. When this occurs, ignition occurs at a very large number of locations throughout the fuel-air mixture almost simultaneously (which would normally lead to a very high heat release rate), but the subsequent burning of each increment of the fuel-air mixture progresses slowly. The reduced rate of combustion is achieved by adding inert gases into the mixture, such as conveniently obtained from the engine exhaust products.

Figure 1A:
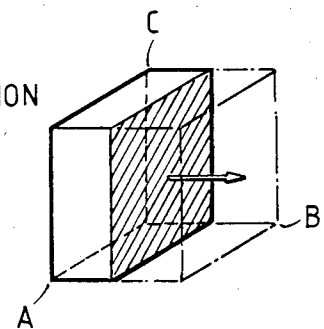
FIG. 1A is a three-dimensional graph for a spark ignition process.
Figure 1B:
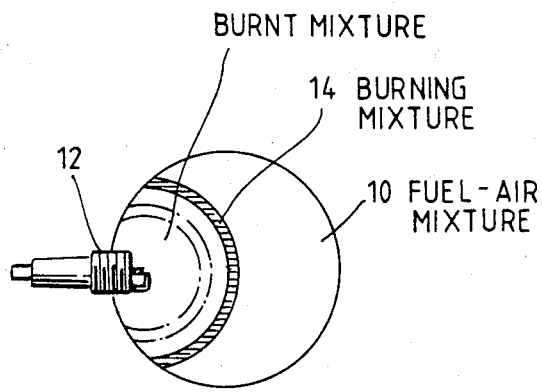
FIG. 1B is a schematic elevational view of the spark ignition process.

The three-dimensional graphs shown in FIGS. 1A, 2A and 3A illustrate their respective processes. Axis A is the volume of prepared mixture, axis B is the volume of reacted mixture per volume of prepared mixture, and axis C is the heat released per unit volume of reacting mixture.

The present invention is directed to a process and an engine using a homogeneous mixture of fuel and air and exhaust products which is ignited spontaneously by high mixture temperatures produced by heating and by compression of the fuel charge. In addition, the engine is quite simple having no complicated high pressure fuel injection systems or carburetors, but only a simple check valve opened by the pressure differential between the fuel pressure and the combustion chamber pressure and having a simple mixture heating system consisting of only a heater element such as a glow plug. The advantage of this process and engine is that the efficiency of the engine is similar to that of a diesel engine, but is higher than a spark ignition engine because the usable range of fuel-air ratios is lower. The present unthrottled engine also has the advantage of having no "knock" of spark ignition processes nor exhaust smoke output of diesel processes.

Referring now to FIG. 4, an engine of the present invention is generally indicated by the reference numeral 20, here shown as a two-stroke engine, although a four-stroke engine with intake and exhaust valves in the cylinder head may be used. The engine 20 includes a cylinder 22 having a piston 24 movable therein and an air inlet and exhaust outlet means such as ports 26 and 28, respectively.

A combustion chamber 30 is connected to the head of the cylinder 22 and is in communication with the cylinder 22. A valve 32, such as a spring loaded check valve, is connected between the combustion chamber 30 and a gaseous fuel supply 34 which may be shut off or opened by a control valve 36. The gaseous fuel may be any suitable fuel such as natural gas, butane or propane which is supplied to the valve 32 under a low pressure, such as 5 psi. The valve 32 opens and closes in response to a differential pressure acting across the valve. The fuel gas pressure is adjusted so that the quantity of gas admitted into the combustion chamber 30 will satisfy the load requirements of the engine 20.

As shown in FIG. 4, the piston 24 has moved downwardly uncovering the air inlet port 26 and exhaust outlet port 28 whereby scavenging air, as indicated by dotted lines 2, flows through the cylinder 22 for exhausting the exhaust products of the previous cycle from the cylinder 22 and admitting fresh air into the cylinder 22 for the next cycle.

Restriction means, such as a restricted entrance 40, is provided in the combustion chamber 30 for several important reasons. It is important to provide a mixture of fuel, exhaust products, and fresh air in the combustion chamber 30 to provide a homogeneous mixture that can be simultaneously ignited by compression. Therefore, the restricted entrance 40 insures that the scavenging air 25 flowing between the ports 26 and 28 cannot easily enter the combustion chamber 30 and sweep out the fuel gas or the exhaust products remaining therein from the last firing cycle. During the scavenging process in the two-stroke engine 20 (or during the intake and exhaust strokes in a four-stroke engine) fuel gas enters the combustion chamber 30 through the spring loaded check valve 32 which is opened by the pressure difference between the fuel gas supply 34 and the cylinder gases. Therefore, during the air-intake stroke, the combustion chamber 30 is supplied with fuel gas which is injected into the remaining exhaust products from the last firing cycle and the cylinder 22 is supplied with fresh air. The quantity of fuel gas supplied, and hence the fuel-air ratio, is controlled by controlling the pressure of the fuel gas supply, as for instance by a pressure control valve (throttling valve) 36.

Referring now to FIG. 5, the engine 20 is shown on the compression stroke. A heating element such as a glow plug 42 is installed in the entrance 40 of the combustion chamber 30 and extends substantially across the entrance 40. During the compression stroke, the fresh air in the cylinder 22 is forced by the piston 24 across the glow plug 42 and into the combustion chamber 30. The increasing pressure, due to the motion of the piston 24, closes the fuel-gas check valve 32. In addition, the fresh air forced into the combustion chamber 30 is heated by the glow plug 42 since this fresh air as indicated by the arrow 44 must flow over the glow plug 42 when entering the combustion chamber 30. The fresh air entering the combustion chamber 30 is also heated by convection from the hot walls of the combustion chamber 30.

When the piston nears top dead center, the conditions are correct for the combustion process that uses a homogeneous mixture with compression ignition, as described in connection with FIGS. 3A and 3B. That is to say, the mixture in the combustion chamber 30 (the fresh air, the fuel charge, and the exhaust products remaining from the last firing cycle) is thoroughly mixed by the turbulence produced by the entering fresh air. The mixture is heated due to the presence of the glow plug 42 as well as to the hot combustion chamber walls of the combustion chamber 30. Ignition occurs spontaneously due to the elevated temperature of the gases but progresses in a controlled fashion due to the suppressing effects of the exhaust products. That is, the normal high rate of combustion of the fuel and air is suppressed by the presence of the exhaust products.

The present invention, therefore, provides a process and an engine using a homogeneous mixture of fuel and air, but ignited spontaneously by high mixture temperatures produced by heating and by compression but which have a reduced rate of combustion due to the exhaust products. The engine may have a compression ratio of between about 8:1 and 14:1 and the amount of exhaust products provided in the mixture is about 20% of the volume of the combustion chamber 30 for suppressing the rate of combustion. The engine 20 may operate over a fuel-air mixture of about 10% of stoichiometric at idle to about 60% of stoichiometric at full load. The stoichiometric fuel-air ratio for natural gas is approximately 0.06 pounds of fuel per pound of air. The temperature for spontaneous ignition of a mixture of natural gas, air, and exhaust gas is about 900° F.

The process of the present invention is apparent from the foregoing description of the operation of the engine and consists of a process of operating an internal combustion engine having a cylinder with a piston movable therein, air inlet and air outlet means connected to the cylinder, a combustion chamber connected to the cylinder head and heating means positioned between the combustion chamber and the cylinder. The process includes admitting a gaseous fuel through a check valve into the combustion chamber and admitting fresh air into the cylinder and exhausting the exhaust products of combustion from the cylinder without sweeping the gaseous fuel and the exhaust products remaining from the previous cycle from the combustion chamber. The process includes compressing the fresh air in the cylinder and moving the compressed fresh air across the heating means into the combustion chamber to provide a homogeneous mixture of exhaust products, fuel and air, and igniting the mixture in the combustion chamber by compression.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts, and steps of the process, will be readily apparent to those skilled in the art and which are encompassed within the spirit of the invention and the scope of the appended claims.

What is claimed is:

1. An internal combustion engine using compression ignition of a homogeneous gaseous fuel-air mixture comprising,
    a cylinder having a piston movable therein,
    air inlet and outlet means connected to the cylinder for admitting fresh air and for exhausting exhaust products therefrom,
    a combustion chamber connected to the cylinder,
    a check valve connected between the combustion chamber and a source of gaseous fuel,
    restriction means connected between the combustion chamber and the cylinder for retaining the gaseous fuel in the combustion chamber, and limiting fresh air entering the cylinder from sweeping the fuel gas and the exhaust products from the last firing cycle out of the combustion chamber, and
    heating means positioned between the combustion chamber and the cylinder and extending substantially across the combustion chamber for heating the fresh air entering the combustion chamber from the cylinder as the piston nears the end of the compression stroke whereby the compression in the combustion chamber of the mixture of exhaust products, fuel and heated air produces spontaneous ignition of the mixture.

2. The apparatus of claim 1 wherein the compression ratio of the engine is between about 8 to 1 and 14 to 1.

3. The apparatus of claim 1 wherein the amount of exhaust gases retained in the mixture is about 20% of the volume of the combustion chamber.

4. A process of operating an internal combustion engine having a cylinder with a piston movable therein, air inlet and outlet means connected to the cylinder, a combustion chamber connected to the cylinder head, and heating means positioned between the combustion chamber and the cylinder comprising,
    admitting a gaseous fuel through a check valve into the combustion chamber,
    admitting fresh air into the cylinder and exhausting the exhaust products of combustion from the cylinder without sweeping the gaseous fuel and the exhaust products remaining from the previous cycle from the combustion chamber,
    compressing the fresh air in the cylinder,
    moving the compressed fresh air across the heating means into the combustion chamber to provide a homogeneous mixture of exhaust products, fuel and air, and
    igniting the mixture in the combustion chamber by compression.

5. The process of claim 4 wherein the amount of exhaust products in the mixture is about 20% of the volume of the chamber for suppressing the rate of combustion.

6. The process of claim 4 wherein the engine operates over a fuel-air mixture between about 10% to 60% of stoichiometric.

7. The method of claim 4 wherein the compression ratio is between about 8 to 1 and 14 to 1.

* * * * *